United States Patent
Warren et al.

(10) Patent No.: US 10,678,331 B2
(45) Date of Patent: Jun. 9, 2020

(54) INPUT DEVICE FOR A GRAPHICAL USER INTERFACE

(71) Applicant: INTERNATIONAL BUSINESS MACHINES CORPORATION, Armonk, NY (US)

(72) Inventors: Matthew J. Warren, Winchester (GB); Laura F. Storey, Eastleigh (GB); Dominik Ullmann, Southampton (GB); Fraser I. MacIntosh, Reading (GB)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 16/049,870

(22) Filed: Jul. 31, 2018

(65) Prior Publication Data

US 2020/0042085 A1 Feb. 6, 2020

(51) Int. Cl.
*G09G 1/00* (2006.01)
*G06F 3/01* (2006.01)
*G06F 3/045* (2006.01)
*G06F 3/038* (2013.01)

(52) U.S. Cl.
CPC .............. *G06F 3/014* (2013.01); *G06F 3/017* (2013.01); *G06F 3/0383* (2013.01); *G06F 3/045* (2013.01); *G06F 2203/0383* (2013.01); *G06F 2203/0384* (2013.01)

(58) Field of Classification Search
CPC . G06F 3/00; G06F 3/014; G06F 3/016; G06F 3/017; G06T 19/00; G06T 19/006
See application file for complete search history.

(56) References Cited

U.S. PATENT DOCUMENTS

| 9,880,619 | B2 | 1/2018 | Parham et al. |
| 2014/0085177 | A1 | 3/2014 | Lyons et al. |
| 2015/0233779 | A1 | 8/2015 | Chen et al. |
| 2016/0259408 | A1* | 9/2016 | Messingher .......... G06F 3/0346 |
| 2017/0262056 | A1 | 9/2017 | Osman |

OTHER PUBLICATIONS

Bowman et al., "Using Pinch Gloves™ for both Natural and Abstract Interaction Techniques in Virtual Environments", Department of Computer Science (0106), Virginia Tech, Blacksburg, VA 24061 USA, Abstract, 6 pages, Article (PDF Available) Jan. 2001.

* cited by examiner

*Primary Examiner* — Michael A. Faragalla
(74) *Attorney, Agent, or Firm* — Teddi E. Maranzano

(57) ABSTRACT

An input device for a graphical user interface is provided. The device includes a finger sensor component for attachment to a finger of a user's hand, a touch sensitive elongate member for positioning along the finger, a thumb sensor component attached to a thumb of the user's hand, and a touch sensitive elongate member for positioning along the thumb. The finger and thumb sensors sense an intersection of contact between the two touch sensitive elongate members to define an input of a coordinate in a two-dimensional plane of a graphical user interface as defined by the lengths of the elongate members providing axis dimensions. The device also includes a pressure sensitive to sense a discrete input event by increased pressure at the intersection of contact of the two touch sensitive elongate members. The device communicates sensed inputs to a remote graphical user interface.

20 Claims, 10 Drawing Sheets

INPUT DEVICE FOR A GRAPHICAL USER INTERFACE

BACKGROUND

The present invention relates to an input device for a graphical user interface, and more specifically to a wearable input device.

An input device is a piece of computer hardware equipment used to provide data and control signals to an information processing system such as a computing device. Pointing devices are the most commonly used input devices today. A pointing device is any human interface device that allows a user to input spatial data to a computer.

Discrete input is made by a single input, such as a click, and a continuous input may be made by a moving positional input, such as a cursor movement on a screen in two-dimensions. In the case of pointing devices such as mouse and touchpads, this is usually achieved by detecting movement across a physical surface.

Movements of the pointing device are echoed on the screen by movements of a user interface pointer, creating a simple, intuitive way to navigate a computer's graphical user interface (GUI).

Pointing device input may be direct or indirect. With direct input, the input space coincides with the display space, i.e. pointing is done in the space where visual feedback or the pointer appears, such as touchscreens. The positional information for direct input devices is absolute. In indirect input, such as a mouse or trackpad, the positional information is relative to another surface and the input device may be lifted and repositioned.

Composite input devices, such as joysticks and other gaming devices, include combinations of input devices having more than two different forms of input.

In virtual reality systems, currently user input is provided via hand held or glove-style controllers that use various mechanisms to interpret the user's hand movement and/or gestures. These are generally bulky, expensive and technically complex devices.

The current solutions tend to focus on replicating mainstream (for example, gamepad style) control inputs in a convenient manner, or attempt to provide whole-hand style input measuring positioning and movement of the hand and fingers (for example, in a glove style).

SUMMARY

According to an aspect of the present invention there is provided an input device for a graphical user interface, comprising: a finger sensor component attached to a finger of a user's hand and including a touch sensitive elongate member for positioning along the finger wherein a position of a touch along the touch sensitive elongate member is sensed; a thumb sensor component attached to a thumb of the user's hand and including a touch sensitive elongate member for positioning along the thumb wherein a position of a touch along the touch sensitive elongate member is sensed; wherein the finger sensor and the thumb sensor sense an intersection of contact between the two touch sensitive elongate members to define an input of a coordinate in a two-dimensional plane of a graphical user interface as defined by the lengths of the elongate members providing axis dimensions; the input device further comprising a pressure sensitive element congruent with the touch sensitive elongate member of one of the finger and thumb sensors to sense a discrete input event by increased pressure at the intersection of contact of the two touch sensitive elongate members; and a communication component to communicate sensed inputs to a remote graphical user interface.

According to an aspect of the present invention there is provided an input device system for a graphical user interface, comprising: an input device as provided in the above aspect; a remote receiving device; and a computing device comprising computer program instructions in a memory, for execution by a processor, whereby the computer program instructions control an input control system for a graphical user interface of the computing device.

According to another aspect of the present invention there is provided an input control system for an input device for a graphical user interface, comprising computer program instructions in a memory for execution by a processor, the computer program instructions comprising: instructions to receive input data from the input device, including input data (e.g., signals) of an intersection of touch sensitive elongate members along finger and thumb sensor components of the input device and input data (e.g., signals) from a pressure sensitive element provided by one of the finger and thumb sensor components; instructions to convert the received input data of the touch sensitive members into an input of coordinates in the graphical user interface with a first touch sensitive elongate member corresponding to an x-coordinate input and a second touch sensitive elongate member corresponding to a y-coordinate input; and instructions to convert received input data of the pressure sensitive element into a discrete control input in the graphical user interface.

According to a further aspect of the present invention there is provided a computer-implemented method for controlling an input device for a graphical user interface, comprising: receiving input data from the input device including input data of an intersection of touch sensitive elongate members along the finger sensor and the thumb sensor of the input device and input data from a pressure sensitive element provided by the finger sensor and the thumb sensor; converting received input data of the touch sensitive members into an input of coordinates in the graphical user interface with a first touch sensitive elongate member corresponding to an x-coordinate input and a second touch sensitive elongate member corresponding to a y-coordinate input; and converting received input data of the pressure sensitive element into a discrete control input in the graphical user interface.

According to another aspect of the present invention there is provided a computer program product for controlling an input device for a graphical user interface, the computer program product comprising a computer readable storage medium having program instructions embodied therewith, the program instructions executable by a processor to cause the processor to: receive input data from the input device including input data of an intersection of touch sensitive elongate members along the finger sensor and the thumb sensor components of the input device and input data from a pressure sensitive element provided by one of the finger sensor and the thumb sensor components; convert received data of the touch sensitive members into an input of coordinates in the graphical user interface with a first touch sensitive elongate member corresponding to an x-coordinate input and a second touch sensitive elongate member corresponding to a y-coordinate input; and convert received input data of the pressure sensitive element into a discrete control input in the graphical user interface.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

An input device is described that is worn on a hand of a user with one sensor component in the form of an elongate strip worn on a finger, preferably the index finger, and one sensor component in the form of an elongate strip worn on a thumb of a user.

The two sensor components are brought together by relative movement of the user's finger and thumb to sense a relative position on each of the elongate strips to provide an input across a variable range of Cartesian coordinates of a two-dimensional plane of a graphical user interface.

The input device consists of a pair of sensor components, one mountable on an index finger and the other mountable on a thumb. Various methods of securing the sensor components to the user's hand may be used, for example, they may be mounted on rings or clips that attach to the finger and thumb, or mounted on lightweight partial gloves covering one finger and the thumb.

Figure 1:
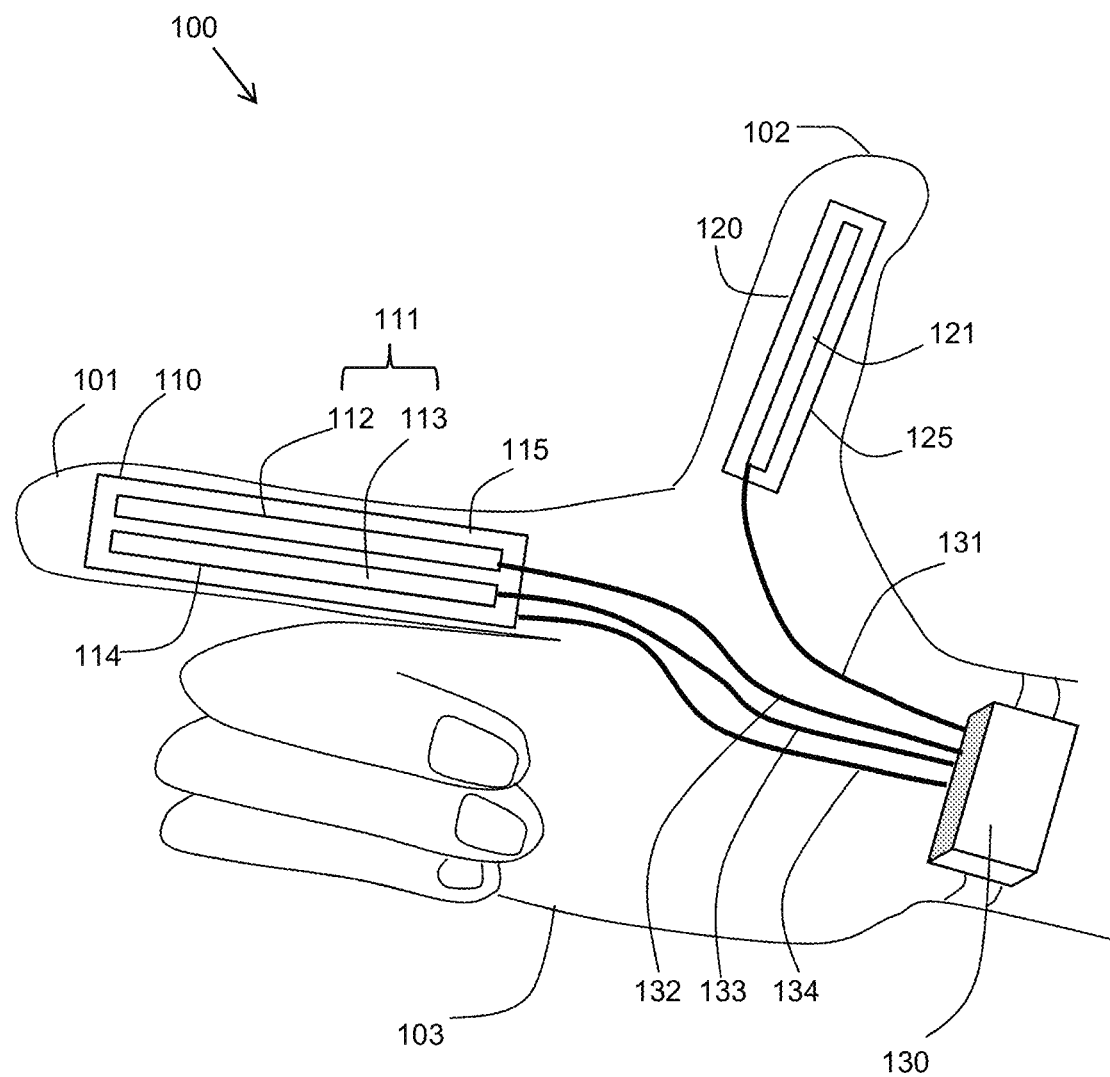
FIG. 1 is a schematic diagram illustrating an example embodiment of an input device in accordance with an aspect of the present invention.

Referring to FIG. 1, a schematic diagram shows an example embodiment of the described input device 100.

The input device 100 has a finger sensor component 110 for attachment to a finger 101 of a user's hand 103 and a thumb sensor component 120 for attachment to a thumb 102 of the user's hand 103.

The finger sensor component 110 includes a touch sensitive elongate member 111 that in this embodiment is formed of a parallel pair of elements 112, 113. In another embodiment, the touch sensitive elongate member 111 may be formed of a single element. The touch sensitive elongate member 111 may detect and report an intersecting touch from the thumb sensor component 120 touch along its length and determine the position of the touch along the length of the member or along the length of each element 112, 113 of the member.

The finger sensor component 110 may include a pressure sensitive element 114 that may be provided as a separate layer underneath or on top of the touch sensitive elongate member 111. In another embodiment, the pressure sensitive element 114 may be provided as an element integrated into the touch sensitive elongate member 111. The pressure sensitive element 114 may be at least congruent with the size of the touch sensitive elongate member 111. The pressure sensitive element 114 may report a force, which may be discrete, continuous or varying, with which a touch is applied at the intersecting touch of the thumb sensor component 120 to provide a pressure input value.

The finger sensor component 110 may include a supporting pad 115 on which the touch sensitive elongate member 111 and the pressure sensitive element 114 are mounted. The finger sensor component 110 may be flexible such that the user may bend their finger 101.

The thumb sensor component 120 includes a touch sensitive elongate member 121 that in this embodiment is formed of a single element. In another embodiment, the touch sensitive elongate member 121 may be formed of a pair of elements. The touch sensitive elongate member 121 may detect and report an intersecting touch from the finger sensor component 110 along its length and determine the position of the touch along the length of the member.

The thumb sensor component 120 may include a supporting pad 125 on which the touch sensitive elongate member 121 is mounted. The thumb sensor component 120 may be flexible such that the user may bend their thumb 102.

The dimensions for the finger and thumb sensor components 110, 120 may be up to 8 cm long and up to 1 cm wide. The dimension of the touch sensitive members 111, 121 may be in the order of 1 to 2 mm wide, up to 8 cm long.

The various sensors of the finger sensor component 110 and the thumb sensor component 120 may be connected to a communication component 130 that may be supported on the user's hand, for example at the user's wrist. In this embodiment, there are: a connecting wire 131 from the touch sensitive elongate member 121 of the thumb sensor component 120, two connecting wires 132, 133 from the parallel pair of elements 112, 113 of the touch sensitive elongate member 111 of the finger sensor component 110, and a connecting wire 134 from the pressure sensitive element 114 of the finger sensor component 110, if this is a separate component. The connecting wires 131, 132, 133, 134 are all connected to the communication component 130. However, it is also envisaged that the sensors may be enabled with wireless transfer of data in which case connecting wires are not required.

In this embodiment, the communication component 130 includes a power source and functionality to receive the sensor data from the sensors and transmit these to a remote receiver device that is described in further detail with reference to FIG. 2. The received sensor data may be transmitted wirelessly or by a wired connection to the remote receiver.

The input device 100 may include a support structure that is not shown in FIG. 1 for mounting the finger and thumb sensor components 110, 120 on the user's hand. For example, this may be in the form of flexible sheaths covering the finger and thumb and supporting the communication device 130.

Figure 2:
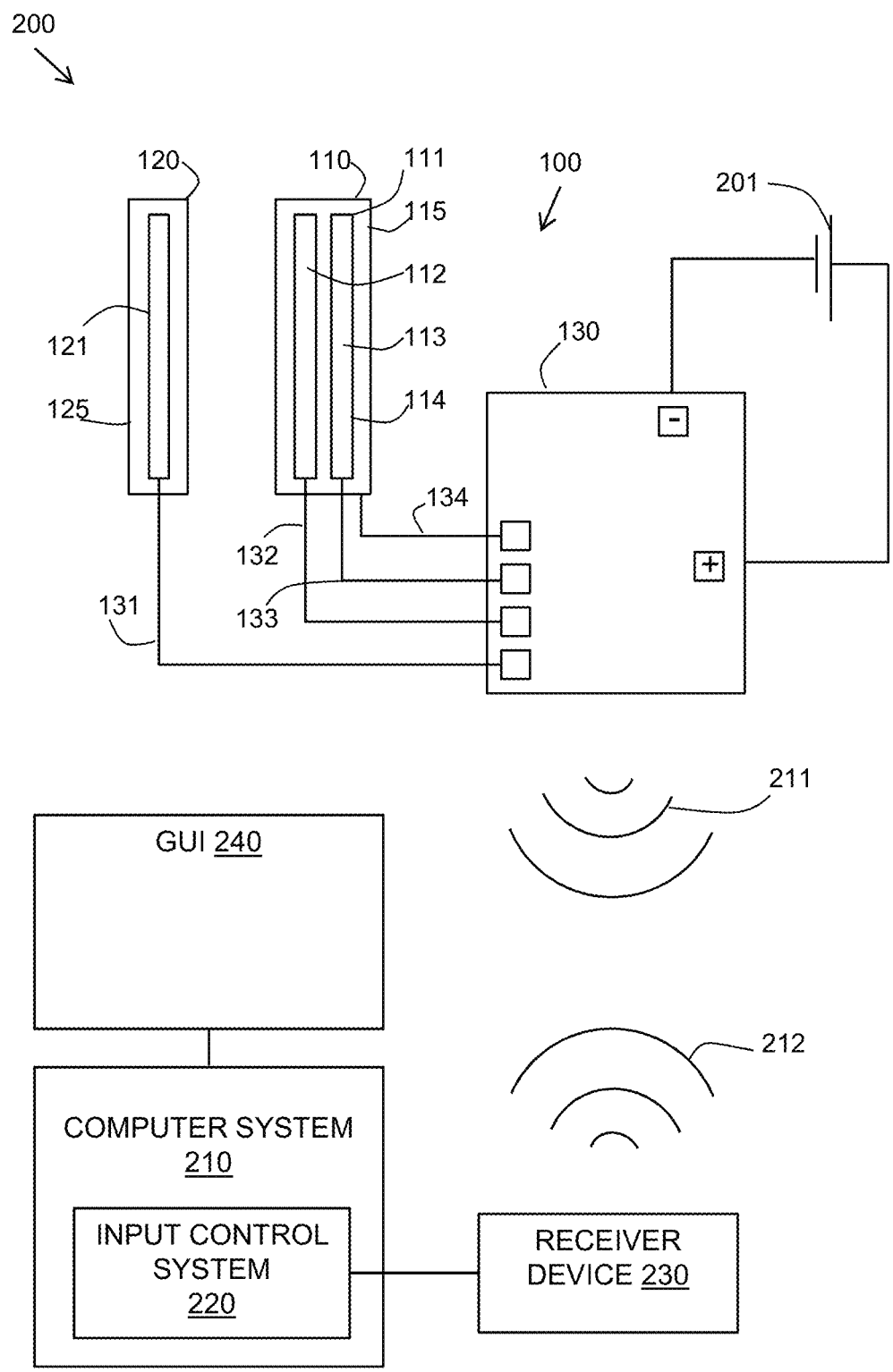
FIG. 2 is a block diagram of an example embodiment of an input device system in accordance with an aspect of the present invention.

Referring to FIG. 2, an example embodiment of an input device system 200 is shown. The input device 100 as shown in FIG. 1 is shown without a user's hand. In FIG. 2, the finger sensor component 110 is shown with the supporting pad 115 supporting a parallel pair of elements 112, 113 of the touch sensitive elongate member 111 and a pressure sensitive element 114. The elements 112, 113, 114 are connected to a communication component 130 via connecting wires 132, 133, 132. The thumb sensor component 120 is shown with a supporting pad 125 supporting a touch sensitive elongate member 121 connected by a connection wire 131 to the communication component 130. The communication component 130 has an energy source 201 in the form of a power supply.

The touch sensitive elongate members 112, 113, 121 may be formed of soft potentiometer strips that may detect a touch happening on their length and can determined where on the length the touch event happened.

The pressure sensitive element 114 may be a force sensitive resistor in the form of a strip and may be combined with the soft potentiometer strips of the touch sensitive elongate members 112, 113 of the finger sensor component 110.

The thumb and finger sensor components 110, 120 may require up to 5V electricity for each of the sensor components. Therefore, the energy source 201 may be small and lightweight, making the overall input device 100 lightweight. The energy source 201 and the thumb and finger sensor components 110, 120 may be attached to a user's hand via a support structure such as a glove or a strap around the user's hand. In one embodiment, the energy source 201 may be on the top of user's wrist.

The communication component 130 may communicate the sensor data to a receiver device 230 that passes the information to an input control system 220 of a computer system 210 that has the graphical user interface 240 that the user is controlling.

In one embodiment, the communication component 130 and the receiver device 230 may use a publish/subscribe communication protocol via a wireless communication 211, 212. The communication component 130 includes a chip having a communication stack, such as TCP/IP, and a microcontroller, acting as a Message Queuing Telemetry Transport (MQTT) client. The communication component 130 includes a publish-subscribe message protocol client that publishes information to a subscribing broker that transfers the information to a graphical user interface control system. This may include publishing any touch event information so the receiver device 230 in the form of a MQTT broker can subscribe to them.

The range of communication may depend on the communication component 130 that transmits the touch events, for example, up to 300 m in line of sight.

Figure 3A:
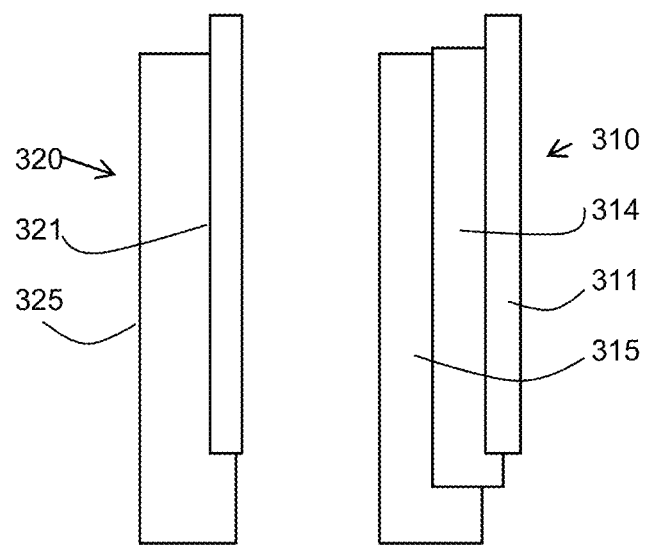
FIGS. 3A and 3B are schematic diagrams showing a first embodiment of sensing components of an input device in accordance with an aspect of the present invention.
Figure 3B:
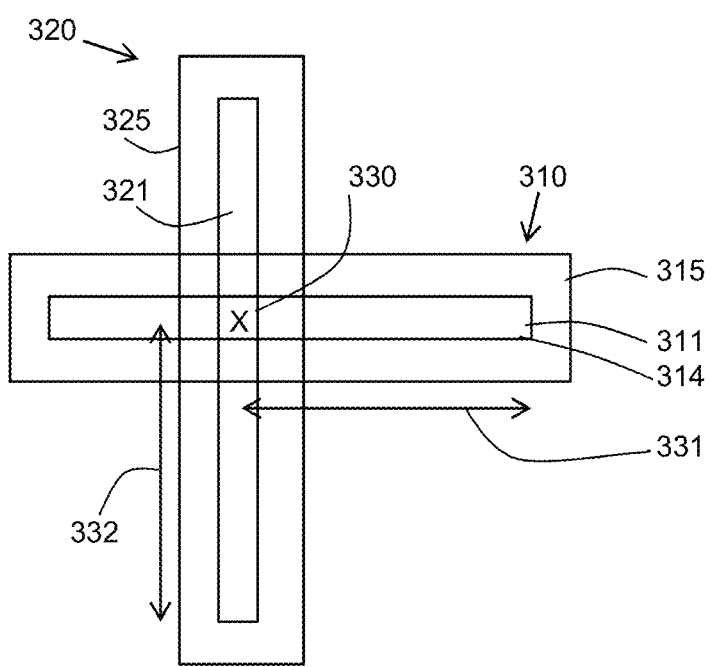

Referring to FIGS. 3A and 3B, schematic diagrams show a first embodiment of thumb and finger sensor components 310, 320. The elements shown in the diagram are not indicative of the real physical implementation or interaction but represent a geometric interaction of the elements.

FIG. 3A shows an exploded view of the elements of the thumb and finger sensor components 310, 320. In this embodiment, the thumb sensor component 320 has a touch sensitive member 321 with a supporting pad 325 and the finger sensor component 310 has a touch sensitive member 311 with a single element, a pressure sensitive element 314 and a supporting pad 315.

FIG. 3B shows the thumb and finger sensor components 310, 320 in a configuration in which they are touched at an intersection point "X" 330. The distance along the touch sensitive member 321 of the thumb sensor component 320 is sensed as a y-axis distance 332 and the distance along the touch sensitive member 311 of the finger sensor component 310 is sensed as an x-axis distance 331, as explained in more detail below.

The thumb and finger sensor component 320, 310 are touched together at an intersection point 330. This obtains a sensed distance 332 along the touch sensitive member 321 of the thumb sensor component 320 giving a distance measurement that is used as a y-axis measurement in a graphical user interface. This also obtains a sensed distance 331 along the touch sensitive member 311 of the finger sensor component 310 giving a distance measurement that is used as an x-axis measurement in a graphical user interface. Varying points of touch may be converted into movement of a cursor in a graphical user interface to move the cursor around the graphical user interface.

In addition, when a predefined amount of pressure is applied at an intersection point 330, in addition to the touching of the touch sensitive members 311, 321, this is sensed by the pressure sensitive element 314 and interpreted as a discrete input event at the graphical user interface, for example, like a mouse click.

Figure 4A:
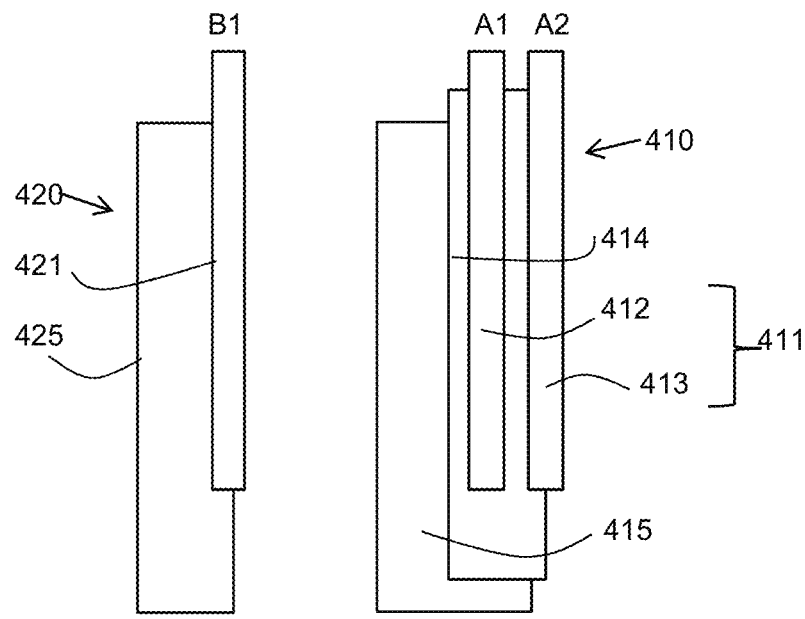
FIGS. 4A, 4B and 4C are schematic diagrams showing a second embodiment of sensing components of an input device in accordance with an aspect of the present invention.
Figure 4B:
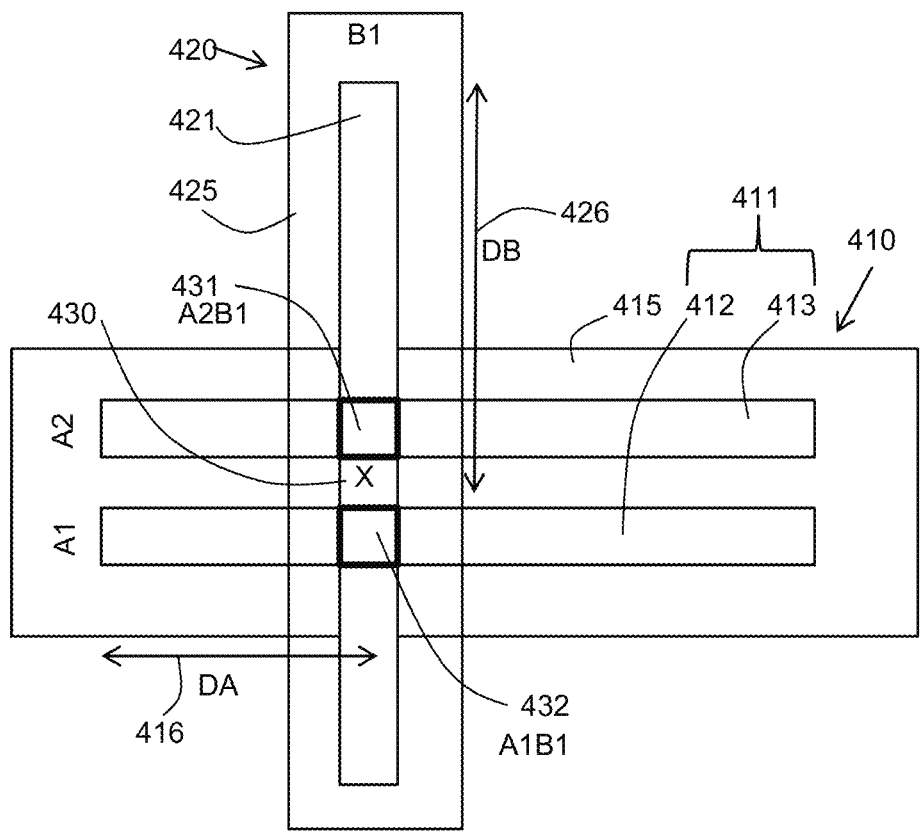
Figure 4C:
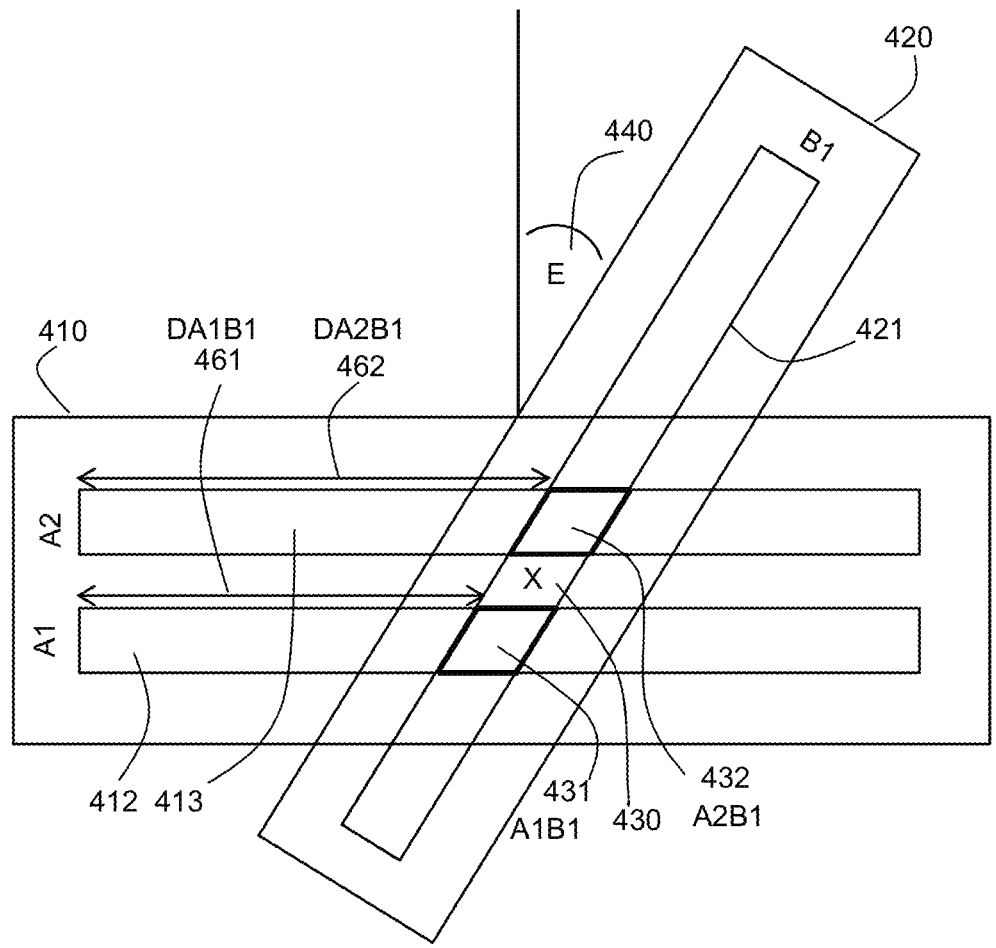

Referring to FIGS. 4A, 4B and 4C, schematic diagrams show a second embodiment of thumb and finger sensor components 410, 420. The elements shown in the diagram are not indicative of the real physical implementation or interaction but represent a geometric interaction of the elements.

FIG. 4A shows an exploded view of the elements of the thumb and finger sensor components 410, 420. In this embodiment, the thumb sensor component 420 has a touch sensitive member 421 (B1) with a supporting pad 425 and the finger sensor component 410 has a touch sensitive member 411 with a pair of elements 412, 413 (A1, A2) (as also shown in FIGS. 1 and 2), a pressure sensitive element 414 and a supporting pad 415. The pressure sensitive element 414 may be incorporated into the supporting pad 415 or into the touch sensitive member 411, and is shown as a separate element for illustrative purposes.

FIG. 4B shows the thumb and finger sensor components 410, 420 in a configuration in which they are touched at an intersection point "X" 430. The distance 426 (DB) along the touch sensitive member 421 of the thumb sensor component 420 is sensed and used as a variation of a y-axis distance in a graphical user interface display area and the distance 416 (DA) along the two elements 412, 413 of the touch sensitive member 411 of the finger sensor component 410 is sensed and used as a variation of an x-axis distance in the graphical user interface display area. The axes may be provided in the other configuration with the thumb as the x-axis and this may depend on a user's preference and configuration.

The touch sensitive member 421 (B1) does not need to be capable of reporting two separate contact positions, simple construction techniques may report the position on touch sensitive member 421 (B1) of X as being between intersection points 431, 432 (A1B1, A2B1). More advanced construction techniques exist that may report both contact positions. Intersection points 431, 432 (A1B1, A2B2) of the touch sensitive elements 411, 412, 421 can therefore be used to determine the (x,y) co-ordinates of position X 430.

Referring to FIG. 4C, as there are two touch sensitive elements 412, 413 of the touch sensitive member 411 of the finger sensor component 410, an additional measurement may be made of the angle of intersection 440 (E) of the finger and thumb sensor components 410, 420.

The twisted lengths along the two touch sensitive elements 412, 413 of the finger sensor component 410 may be measured as length 461 (DA1B1) and length 462 (DA2B1) and their difference together with the dimensions of the elements used to determine the angle of intersection 440 (E).

Figure 5:
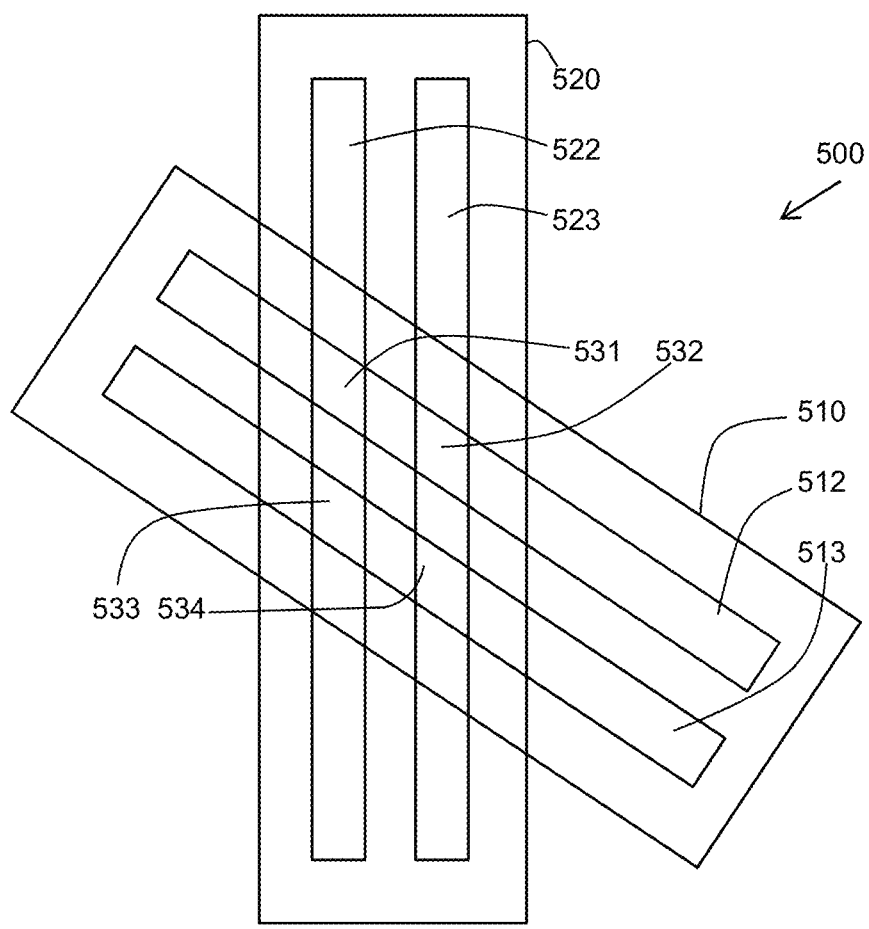
FIG. 5 is a schematic diagram showing a third embodiment of sensing components of an input device in accordance with an aspect of the present invention.

Referring to FIG. 5, a third embodiment 500 of thumb and finger sensor components 510, 520 may be provided wherein both the thumb sensor component 520 and the finger sensor component 510 have a pair of touch sensitive elements 512, 513 and 522, 523. This arrangement provides four points of intersection 531, 532, 533, 534 that may be used for measurement of an angle of intersection of the thumb and finger sensor components 510, 520.

Figure 6:
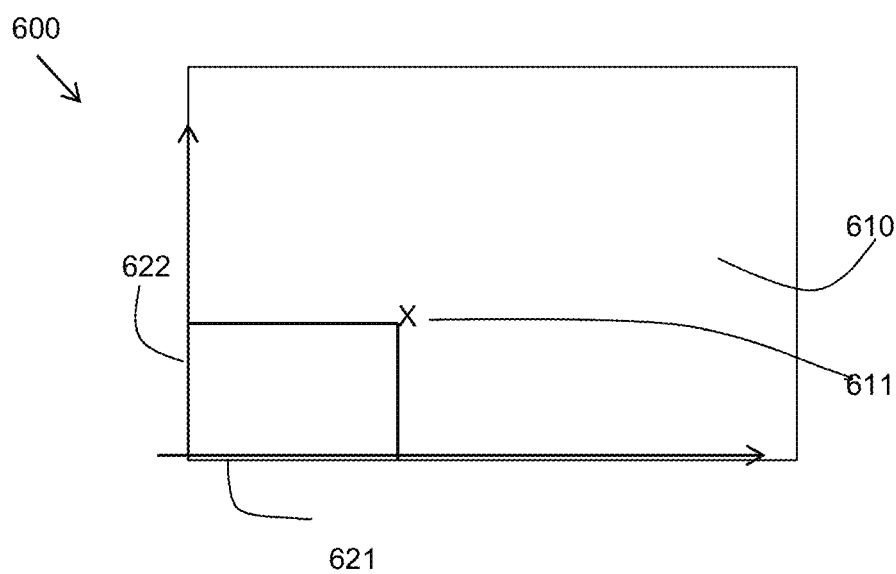
FIG. 6 is a schematic diagram of a graph showing coordinate inputs in a graphical user interface using the described input device.

Referring to FIG. 6, a schematic diagram 600 shows a display area 610 of a graphical user interface. A point X 611 on the display 610 of a cursor or pointer may be controlled by the described input device. The x-axis 621 of the point X 611 may be controlled by a distance of touch along the finger sensor component and the y-axis 622 of the point X 611 may be controlled by a distance of touch along the thumb sensor component. In this way the intersection of touch between the finger and thumb sensor components may be used to navigate a cursor or pointer around the display 610. A pressure event between the finger and thumb sensor components may be interpreted as an input event in the graphical user interface at the point on the display 610.

Detected values variables of the input device may include: pressure, orientation and intersection coordinates. A rate of change of the variables may be obtained when combined with a processing unit sampling the data at intervals.

The interpretation and combination of these measurable values can be used to measure the expression of a wide range of interactions, from simple (x,y) spatial movement and button press' style inputs, to gestures and movements modified by continuous pressure input, etc.

Spatial Position and Movement

The simple point of intersection between the thumb and finger sensor components can be used to generate an (x,y) coordinate input value. The thumb sensor component may correspond to y-coordinates where the base of the thumb is y=maxY and the tip of the thumb is y=0. The finger sensor component may correspond to x-coordinates, where the base of the finger is x=maxX and the tip of the finger is x=0. The components may be configured to correspond to the opposing axes and/or to the opposite orientation of maximum and minimum coordinates.

There may be a calibration phase when using the device to map the physical range of motion of the input device and input scales to a logical range of motion and input scales. For example, while the device can be seen as providing (x,y) co-ordinates over a square grid, the physical motion of the user's fingers and thumb may not be perfectly square. In this case the calibration phase would ask the user to move from corner extreme to extreme when expressing their input from corner to corner. This would not be a square shape in reality due to restrictions on finger and thumb movement, but the physical movement may be logically mapped to a perfect square.

Pressure Input

The pressure sensitive nature of at least one of the elements of the thumb and finger sensor components may be used to provide an input value that may be interpreted as a discrete input (for example, a tap, a press or impact) or as a range of force.

The discrete input may be defined as being a pressure exerted for less than a predefined period of time and of a pressure greater than a predefined level. The discrete input may be provided at the coordinate point of the graphical user interface controlled by the intersection of the thumb and finger to make an interface control input (such as a selection).

A continuous range of input may be provided by the pressure at the point of intersection of the thumb and the finger. This range may be applied whilst moving the point of intersection to move the (x,y) coordinates.

The pressure sensitivity in conjunction with the other input values that may be generated provides an input method that is not currently widely exploited. In addition to the ability to emulate a discrete input, the pressure may also express how hard the press type gesture has been performed (for example, to provide 'piano key' style pressure sensitivity). This enables a strength of force input as the movement derives other inputs (such as coordinate position or twist) that can be constantly modified by the pressure input.

Speed of Input

A speed of movement of the (x,y) coordinates may be measured by sampling the sensor data at intervals as the point of interaction is changed.

Angle of Intersection and Twist Input

The angle between the thumb and finger at the point of intersection may be measurable from the points of contact of the two parallel lines in at least one of the sensor components. This can be used to generate a twist-style input value.

The twist input provides the current angle of intersection of the opposing touch sensitive elements at a moment in time, and hence a rate of change of this angle may be obtained when taken over consecutive moments in time. This may be envisaged as providing input to a dial-type control, or interpreted as an 'amount of spin', for example, if the twist were part of a movement that was being interpreted as a ball-throw in a virtual environment.

The twist input may be applied when the middle of the thumb touches the middle of the index finger (where the middle joint is). To trigger the twisting event, the thumb may remain still while the index finger bends in the middle joint, thus generating a unique reading of the sensors. From the sensor data it may be inferred how much twisting was done and how fast. Twisting motion may be used for some intuitive control of a computing device (for example, it could mimic the twisting movement of a volume button that can be rotated for volume control).

The thumb and finger touch sensitive elements may constantly report their angle of intersection, when this is a value that is being used as an input. The user may have to consciously ensure the angle of intersection of their finger and thumb indicates their desired angle. A calibration process prior to use may ask the user to set a 90 degree vertical, 90 degree horizontal, and other angles in a way that feels comfortable to them. This means the user does not have to actually get to 90 degrees etc. The space of angle input may then be logically mapped to a 0-360 degree input space.

Figure 7A:
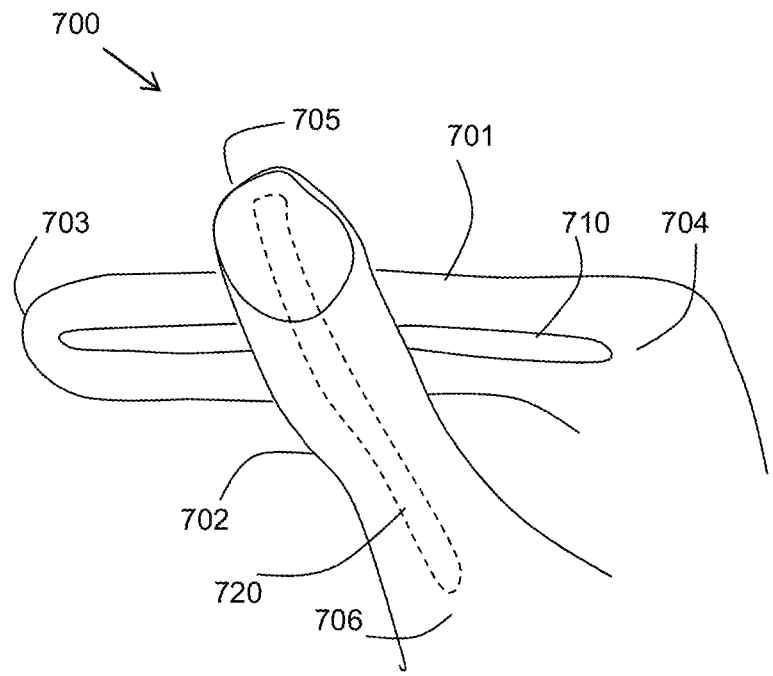
FIGS. 7A and 7B show schematic diagrams of example sensing components of an input device in accordance with an aspect of the present invention in use on a user's hand.
Figure 7B:
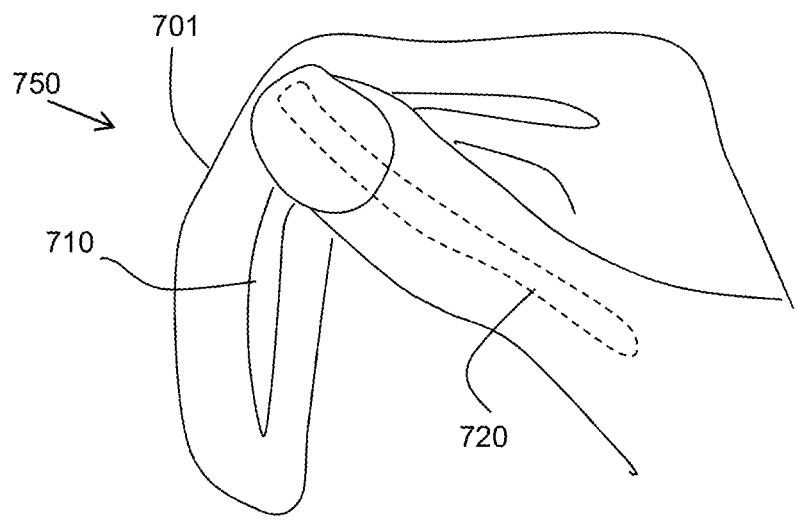

Referring to FIGS. 7A and 7B, schematic diagram 700, 750 illustrate the use of the finger and thumb sensor components 710, 720 of the described input device in use on a user's finger 701 and thumb 702.

FIG. 7A illustrates a simple touch event. Given that the thumb 702 corresponds to y-coordinates where base 706 of the thumb is y=maxY and tip 705 of the thumb is y=0. The index finger 701 corresponds to x-coordinates, where the base 704 of the finger is x=maxX and the tip 703 of the finger is x=0. A simple touch event is shown with coordinates x=maxX/2 and y=maxY/2 and a pressure reading of force of the thumb 702 on the finger 701.

FIG. 7B, illustrates a twist event, where the starting coordinates are same as in FIG. 7A but the readings will differ once the user starts bending or twisting the index finger 701.

Figure 8:
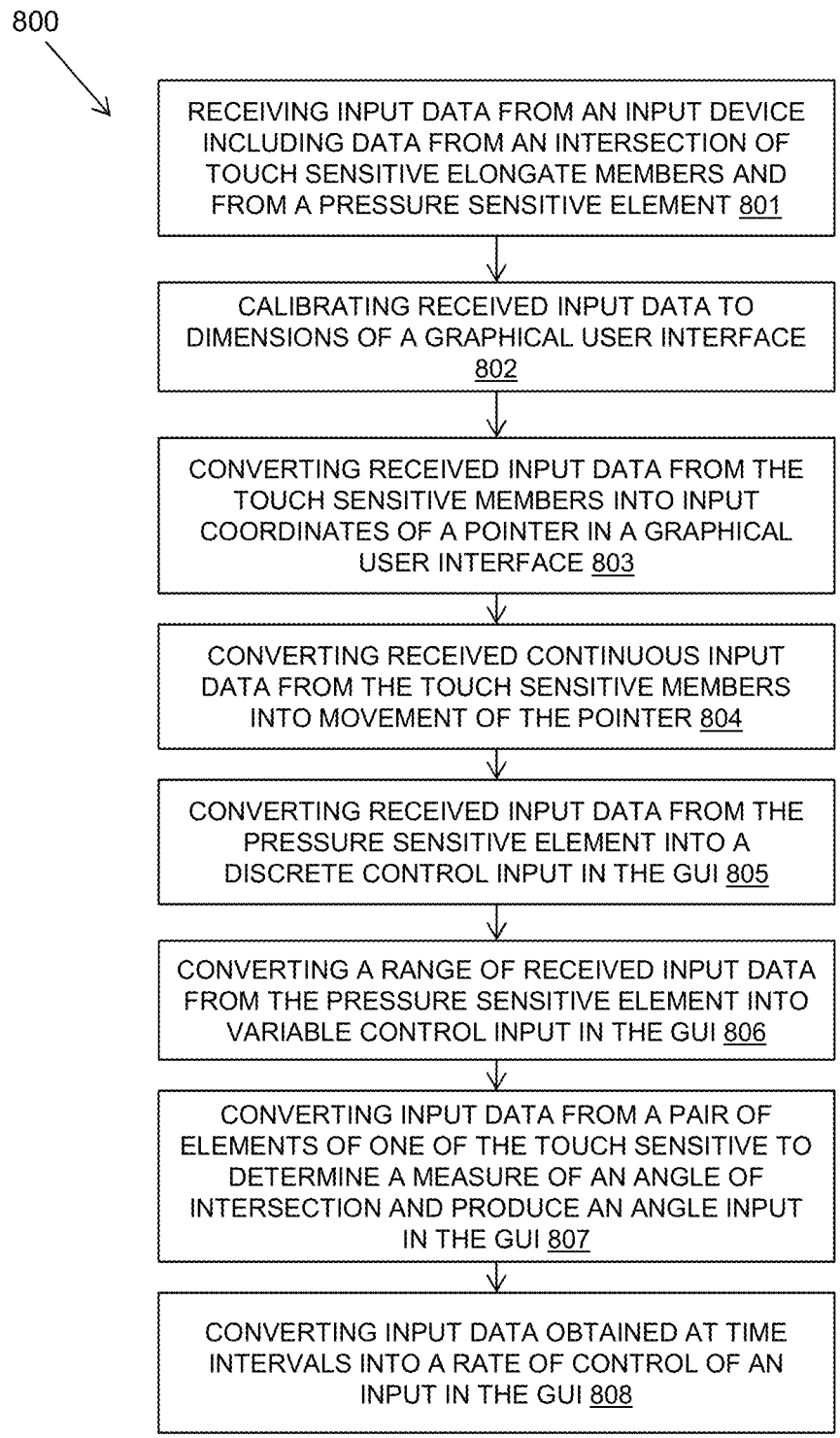
FIG. 8 is a flow diagram of an example embodiment of a method in accordance with the present invention.

Referring to FIG. 8, a flow diagram 800 shows an example embodiment of a method for controlling an input device for a graphical user interface.

The method may receive 801 input data from the input device including input data of an intersection of touch sensitive elongate members along finger and thumb sensor components of the input device and from a pressure sensitive element provided by one of the finger sensor and the thumb sensor components.

The method may calibrate 802 the received input data of the sensed inputs of a user to correspond to required input parameters in the graphical user interface.

The method may convert 801-808 received input data of different inputs indicated by the input device including the following, which may be received and converted at different times or simultaneously, as appropriate.

The method may convert 803 received input data of the touch sensitive members into an input of coordinates of a pointer in the graphical user interface with a first touch sensitive elongate member corresponding to an x-coordinate input and a second touch sensitive elongate member corresponding to a y-coordinate input. The method may convert 804 received continuous input data of the sensed intersection of contact between the two touch sensitive elongate members into a movement of the pointer.

The method may convert 805 received input data of the pressure sensitive element into a discrete control input in the graphical user interface.

The method may convert 806 a range of pressure inputs from the pressure sensitive element to a variable input control parameter in the graphical user interface.

The method may convert 807 input data from a pair of elements of one of the touch sensitive members to determine a measure of an angle of intersection of the members and produce an angle input control parameter in the graphical user interface.

The method may convert 808 input data obtained at time intervals into a rate of control of an input in the graphical user interface.

Figure 9:
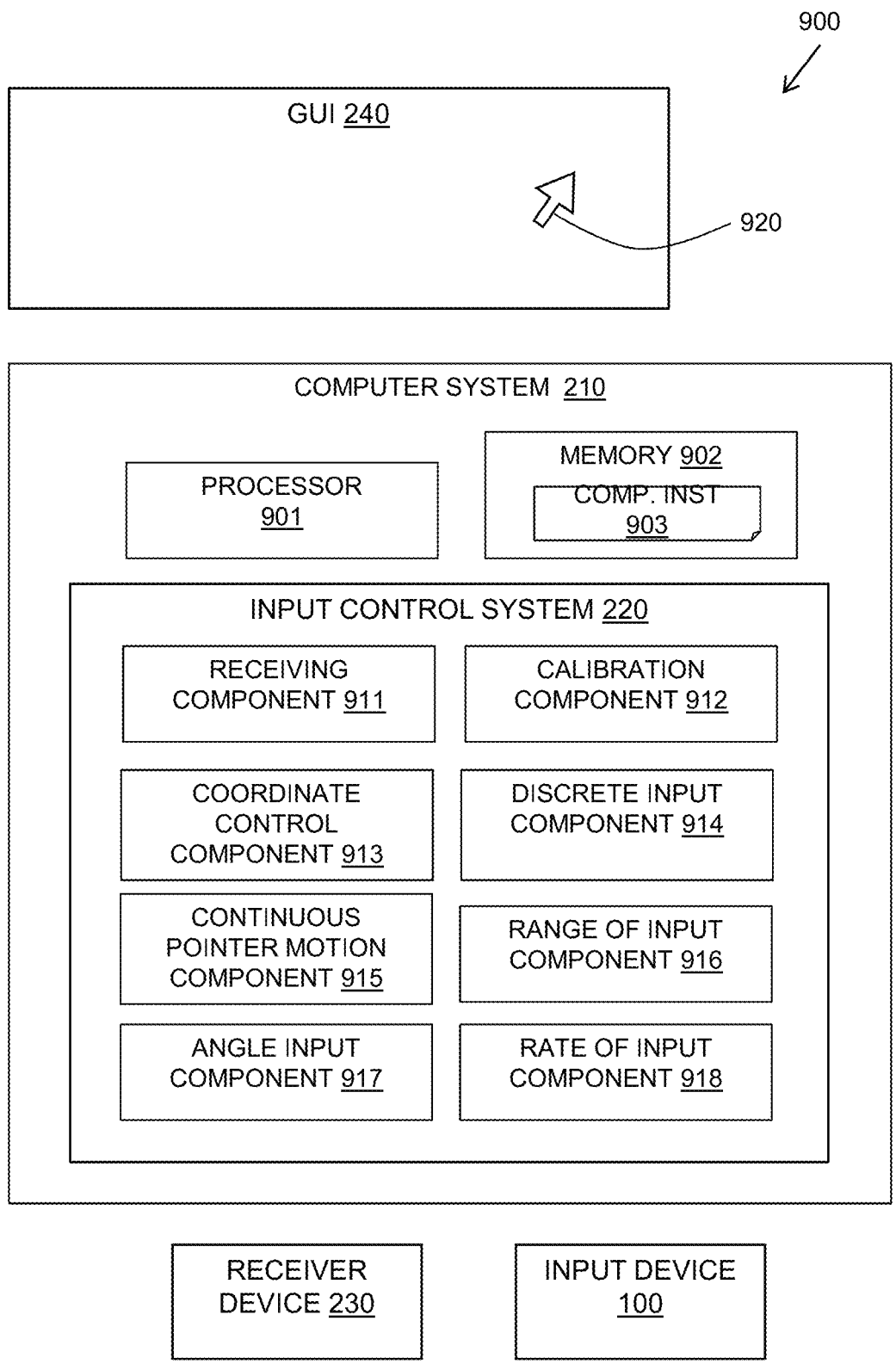
FIG. 9 is block diagram of an example embodiment of an input device system in accordance with the present invention.

Referring to FIG. 9, a block diagram 900 shows an example embodiment of the described system 900 including a computer system 210 that includes a graphical user interface 240 and an input device 100 as described. The system 900 also includes a receiver device 230 for receiving input data from the input device 100 connected to the input control system 220.

The computer system 210 includes at least one processor 901, a hardware module, or a circuit for executing the functions of the described components which may be software units executing on the at least one processor. Multiple processors running parallel processing threads may be provided enabling parallel processing of some or all of the functions of the components. Memory 902 may be configured to provide computer instructions 903 to the at least one processor 901 to carry out the functionality of the components.

The input control system 220 includes a receiving component 911 for receiving input data from the input device 100 including input data of an intersection of touch sensitive elongate members along the finger sensor and the thumb sensor components of the input device and input data from a pressure sensitive element provided by one of the finger sensor and the thumb sensor components. The input control system 220 may include a calibration component 912 for calibrating the received input data of the sensed inputs of a user to correspond to required input parameters in the graphical user interface 240.

The input control system 220 may include a coordinate control component 913 for converting received input data of the touch sensitive members into an input of coordinates in the graphical user interface 240 with a first touch sensitive elongate member corresponding to an x-coordinate input and a second touch sensitive elongate member corresponding to a y-coordinate input.

The input control system 220 may include a discrete input component 914 for converting received input data of the pressure sensitive element into a discrete control input in the graphical user interface 240. Discrete input component 914 may convert received input data of the touch sensitive members into an input of coordinates of a pointer 920 in the graphical user interface 240 with a first touch sensitive elongate member corresponding to an x-coordinate input and a second touch sensitive elongate member corresponding to a y-coordinate input. The input control system 220 may include a continuous pointer motion component 915 for converting received continuous input data of the sensed intersection of contact between the two touch sensitive elongate members into a movement of the pointer 920.

The input control system 220 may include a range of input component for converting a range of pressure inputs from the pressure sensitive element to a variable input control parameter in the graphical user interface 240.

The input control system 220 may also include an angle input component 917 for converting input data from a pair of elements of one of the touch sensitive members to determine a measure of an angle of intersection of the members and produce an angle input control parameter in the graphical user interface 240.

The input control system 220 may further include a rate of input component 918 for converting input data obtained at time intervals into a rate of control of an input in the graphical user interface 240.

The input device may be used in interaction with a graphical user interface of a computing device or in augmented or virtual environments. The input device can detect the points of intersection of finger-mounted sensors so that pressure and orientation of the fingers can be detected. The described input device provides a set of input parameters that enables input actions to express a range of input actions with a much smaller form factor in a lightweight device.

The input device uses the arrangement of small elongate contact position and pressure sensitive strips worn on a user's index finger and thumb such that opposing 'tracks' can be bought into contact and manipulated, and elements of the interaction between the two tracks measured and used to generate input data.

One possible use of this would be, for example in a virtual reality environment. The user may wish to indicate a push-type interaction with an object in a three dimensional scene. Current technology may either use a speed of movement at the time the avatar-element interacted with the 3D scene object to provide an indication of the strength the user wished to use to push the 3d scene object, or would require use of a constant/hard coded value that would be the same regardless of the speed the user indicated, with the constant value applied at the moment of impact of the avatar with the 3D scene object. Neither of these situations is ideal.

In contrast, the method disclosed enables the user to indicate the strength of the push via the level of pressure applied to the input device, while at the same time enabling a continuous high or low speed movement of an avatar element as it interacts with the scene object. This would enable "fast and light" or "slow but firm" interactions with scene objects to be generated, enriching the immersive feeling of interaction with the virtual reality environment. Such an input would allow a virtual reality user to push scene objects around gently or firmly or with variation in strength over time.

There are also applications for use of the device outside the virtual reality context. For example, day to day typing and mouse interactions currently require the user to move their hands away from the keyboard and back again repeatedly, interrupting the flow of the typing activities. By placing the control method onto the index finger and thumb of a user, rapid switching between typing action and pointing/clicking style action is enabled, giving the user an alternative and potentially more fluid interaction with a pointing device while performing typing-intensive tasks.

Figure 10:
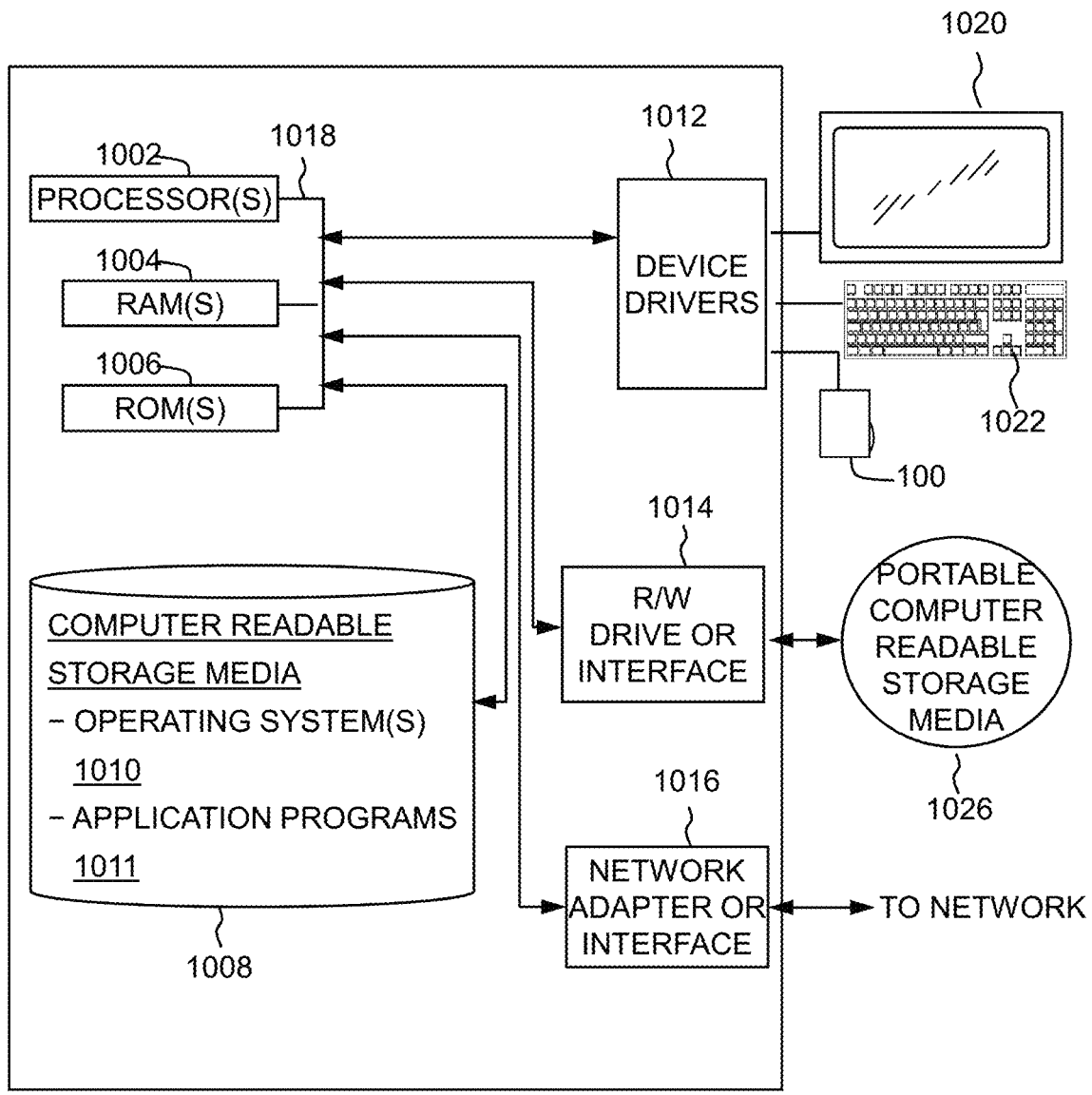
FIG. 10 is a block diagram of an embodiment of a computer system in which the present invention may be implemented.

FIG. 10 depicts a block diagram of components of the computing device of input control system 220 of FIG. 9, in accordance with an embodiment of the present invention. It should be appreciated that FIG. 10 provides only an illustration of one implementation and does not imply any limitations with regard to the environments in which different embodiments may be implemented. Many modifications to the depicted environment may be made.

Computing device can include one or more processors 1002, one or more computer-readable RAMs 1004, one or more computer-readable ROMs 1006, one or more computer readable storage media 1008, device drivers 1012, read/write drive or interface 1014, and network adapter or interface 1016, all interconnected over a communications fabric 1018. Communications fabric 1018 can be implemented with any architecture designed for passing data and/or control information between processors (such as microprocessors, communications and network processors, etc.), system memory, peripheral devices, and any other hardware components within the system.

One or more operating systems 1010, and application programs 1011, are stored on one or more of the computer readable storage media 1008 for execution by one or more of the processors 1002 via one or more of the respective RAMs 1004 (which typically include cache memory). In the illustrated embodiment, each of the computer readable storage media 1008 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 1014 to read from and write to one or more portable computer readable storage media 1026. Application programs 1011 on computing device can be stored on one or more of the portable computer readable storage media 1026, read via the respective R/W drive or interface 1014 and loaded into the respective computer readable storage media 1008.

Computing device can also include a network adapter or interface 1016, such as a TCP/IP adapter card or wireless communication adapter. Application programs 1011 on computing device can be downloaded to the computing device from an external computer or external storage device via a network (for example, the Internet, a local area network or other wide area networks or wireless networks) and network adapter or interface 1016. From the network adapter or interface 1016, the programs may be loaded into the computer readable storage media 1008. The network may comprise copper wires, optical fibers, wireless transmission, routers, firewalls, switches, gateway computers and edge servers.

Computing device can also include a display screen 1020, a keyboard or keypad 1022, and a computer input device of the type described 100. Device drivers 1012 interface to display screen 1020 for imaging, to keyboard or keypad 1022, to computer mouse or touchpad 1024, and/or to display screen 1020 for pressure sensing of alphanumeric character entry and user selections. The device drivers 1012, R/W drive or interface 1014, and network adapter or interface 1016 can comprise hardware and software stored in computer readable storage media 1008 and/or ROM 1006.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. An input device for a graphical user interface, comprising:
    a finger sensor component configured for attachment to a finger of a user's hand and including a touch sensitive elongate member for positioning along the finger;
    a thumb sensor attached to a thumb of the user's hand and including a touch sensitive elongate member for positioning along the thumb;
    wherein the touch sensitive elongate member of the finger sensor component detects and reports a touch from the touch sensitive elongate member of the thumb sensor, and the touch sensitive elongate member of the thumb sensor detects and reports a touch from the touch sensitive elongate member of the finger sensor component;
    wherein the finger sensor and the thumb sensor sense an intersection of contact between the touch sensitive elongate member of the finger sensor component and the touch sensitive elongate member of the thumb sensor to define an input of a coordinate in a two-dimensional plane of a graphical user interface as defined by the lengths of the elongate members providing axis dimensions;
    the input device further comprising a pressure sensitive element congruent with the touch sensitive elongate member of one of the finger sensor and the thumb sensor, wherein the pressure sensitive element senses a discrete input event by increased pressure at the intersection of contact of the touch sensitive elongate member of the finger sensor component and the touch sensitive elongate member of the thumb sensor; and a communication component for communicating sensed inputs to a remote graphical user interface.

2. The input device as claimed in claim 1, wherein the sensing of an intersection of contact between the touch sensitive elongate member of the finger sensor component and the touch sensitive elongate member of the thumb sensor to define an input of a coordinate in a two-dimensional plane is continuous to provide a movement input convertible into a correspond pointer movement in the two-dimensional plane of the graphical user interface.

3. The input device as claimed in claim 1, wherein the sensing of an intersection is carried out at time intervals to obtain an input of a rate of movement as an input control parameter.

4. The input device as claimed in claim 1, wherein the pressure sensitive element senses a range of pressure inputs to be used as a variable input control parameter.

5. The input device as claimed in claim 1, wherein at least one of the touch sensitive elongate members is formed of a parallel pair of elements such that a sensed intersection of contact between the touch sensitive elongate member of the finger sensor component and the touch sensitive elongate member of the thumb sensor includes a measure of an angle of intersection of the members;

and wherein the measure of the angle of intersection is used as an angle input control parameter.

6. The input device as claimed in claim 5, including sensing data at the intersection at time intervals to measure a change in the angle of intersection to provide a rotation input parameter.

7. The input device as claimed in claim 1, wherein the input device includes a wearable support structure for the finger and thumb components in the form of an index finger and thumb sheath or glove.

8. The input device as claimed in claim 1, wherein the input device includes a power source for powering the finger sensor and the thumb sensor components and the communication component.

9. The input device as claimed in claim 1, wherein the touch sensitive elongate members are formed of soft potentiometer strips that detect a point of touch and where the touch is along the length of the strip and the pressure sensitive element is formed of a force sensitive resistor.

10. The input device as claimed in claim 1, wherein the communication component is a wireless signal transmitter capable of pushing sensed input information to a remote receiving device.

11. The input device as claimed in claim 10, wherein the communication component includes a publish-subscribe messaging protocol client publishing information to a subscribing broker that transfers the information to a graphical user interface control system.

12. The input device as claimed in claim 1, wherein:
the touch sensitive elongate member of the thumb sensor component corresponds to a range of y-coordinates from one end of the member equal to zero and an opposite end of the member being a maximum y dimension; and
the touch sensitive elongate member of the finger sensor component corresponds to a range of x-coordinates from one end of the member equal to zero and an opposite end of the member being a maximum x dimension.

13. An input control system for an input device for a graphical user interface, comprising:

a processor and a memory configured to provide computer program instructions to the processor to execute the function of the components:

a receiving component for receiving data input from the input device including input data of an intersection of touch sensitive elongate members along a finger sensor and a thumb sensor components of the input device and input signals from a pressure sensitive element provided by one of the finger sensor and the thumb sensor components;

a coordinate control component for converting received input data of the touch sensitive members into an input of coordinates in the graphical user interface with a first touch sensitive elongate member corresponding to an x-coordinate input and a second touch sensitive elongate member corresponding to a y-coordinate input; and a discrete input component for converting received input data of the pressure sensitive element into a discrete control input in the graphical user interface.

14. A computer-implemented method for controlling an input device for a graphical user interface, comprising:

receiving signals from the input device including input signals of an intersection of touch sensitive elongate members along finger and thumb sensor components of the input device and input signals from a pressure sensitive element provided by one of the finger and thumb sensor components;

converting received signals of the touch sensitive members into an input of coordinates in the graphical user interface with a first touch sensitive elongate member corresponding to an x-coordinate input and a second touch sensitive elongate member corresponding to a y-coordinate input; and converting received signals of the pressure sensitive element into a discrete control input in the graphical user interface.

15. The method as claimed in claim 14, further comprising:

receiving a continuous sensed intersection of contact between the touch sensitive elongate member of the finger sensor component and the touch sensitive elongate member of the thumb sensor; and converting the continuous sensed intersection to provide a movement input of a corresponding pointer movement in the two-dimensional plane of the graphical user interface.

16. The method as claimed in claim 14, wherein the pressure sensitive element senses a range of pressure inputs and the method further comprises:

receiving a range of pressure inputs; and converting the range of pressure inputs to a variable input control parameter in the graphical user interface.

17. The method as claimed in claim 14, wherein at least one of the touch sensitive elongate members of the input device is formed of a parallel pair of elements, and the method further comprises:

receiving signals from the parallel pair of elements;

determining a measure of an angle of intersection of the members; and converting the measure of an angle of intersection into an angle input control parameter in the graphical user interface.

18. The method as claimed in claim 14, further comprising:

receiving sensed inputs at time intervals to provide a rate of input change; and converting the rate of input change into a rate of movement as an input control parameter in the graphical user interface.

19. The method as claimed in claim 14, further comprising calibrating sensed inputs of a user to correspond to input parameters in the graphical user interface.

20. The method as claimed in claim 14, further comprises publishing, by the communication component, information to a subscribing broker that transfers the information to the graphical user interface control system.

* * * * *